United States Patent
Nicolai

[11] Patent Number: 5,859,385
[45] Date of Patent: Jan. 12, 1999

[54] METHOD OF PRODUCING SHRINK SLEEVES FOR CABLE CONNECTIONS AND JUNCTIONS

[75] Inventor: Norbert Nicolai, Dorsten, Germany

[73] Assignee: Krone Aktiengesellschaft, Berlin-Zehlendorf, Germany

[21] Appl. No.: 725,993

[22] Filed: Oct. 4, 1996

[30] Foreign Application Priority Data

Oct. 6, 1995 [DE] Germany .......... 195 37 208.5
Sep. 19, 1996 [DE] Germany .......... 196 38 244.0

[51] Int. Cl.⁶ ............................................. H02G 8/29
[52] U.S. Cl. ............................................. 174/93
[58] Field of Search ............................. 174/93, DIG. 8, 174/73.1, 74 A; 285/381, 901; 428/36.5, 36.9

[56] References Cited

U.S. PATENT DOCUMENTS

| | | | |
|---|---|---|---|
| 3,615,972 | 10/1971 | Morehouse, Jr. et al. | 156/79 |
| 4,035,534 | 7/1977 | Nyberg | 428/34.9 |
| 4,070,746 | 1/1978 | Evans et al. | 20/450 |
| 4,234,518 | 11/1980 | Yoshida et al. | 568/377 |
| 4,265,801 | 5/1981 | Moody et al. | 524/430 |
| 4,452,838 | 6/1984 | Ueno | 428/35.1 |
| 4,740,657 | 4/1988 | Tsukagoshi et al. | 174/88 R |
| 4,802,509 | 2/1989 | Brandolf | 138/110 |
| 5,137,478 | 8/1992 | Graf et al. | 439/874 |
| 5,175,032 | 12/1992 | Steele et al. | 428/34.9 |
| 5,298,300 | 3/1994 | Hosoi et al. | 428/34.9 |

FOREIGN PATENT DOCUMENTS 0 116 393  8/1984  European Pat. Off. .
38 33 415  4/1990  Germany .

*Primary Examiner*—Bot L. Ledynh
*Assistant Examiner*—Joseph Waks
*Attorney, Agent, or Firm*—Herbert Dubno

[57] ABSTRACT

A method of making a shrink sleeve in which the inner surface of the shrink sleeve is provided in a hot melt adhesive and a cross-linking substance which, when heat is provided the shrink sleeve onto a cable, causes cross linking of the hot melt adhesive to reduce its flowability.

22 Claims, 2 Drawing Sheets

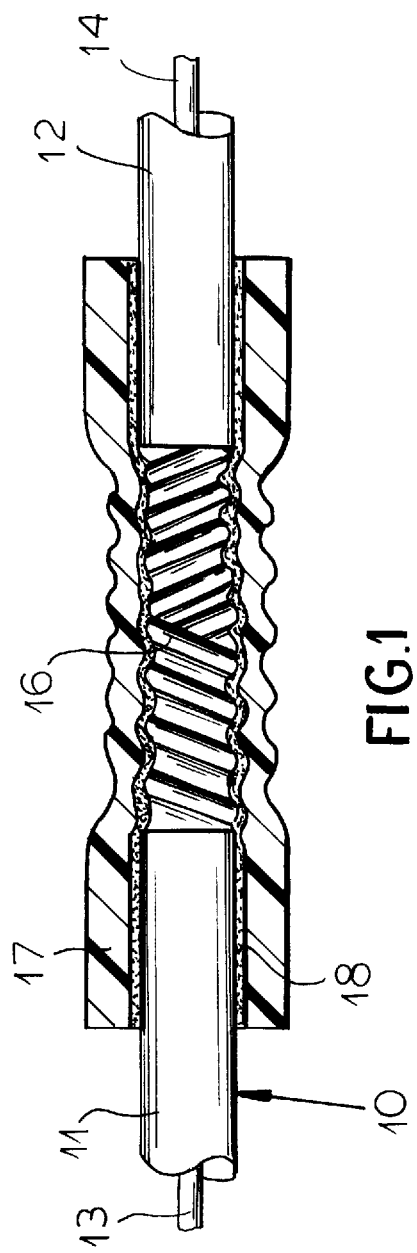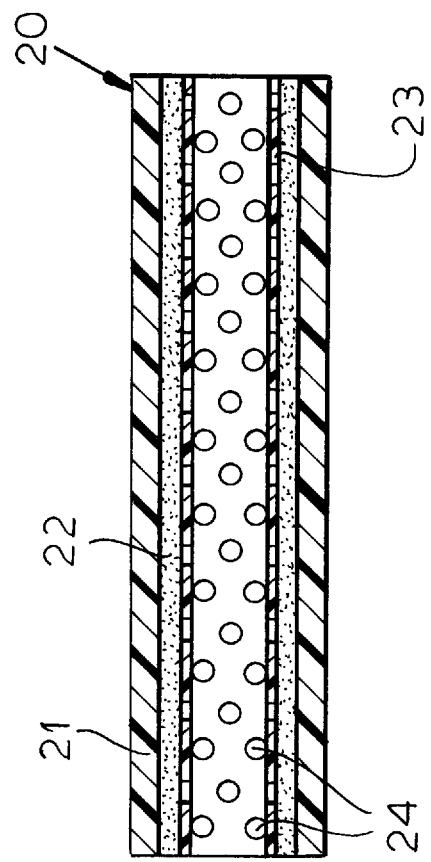

METHOD OF PRODUCING SHRINK SLEEVES FOR CABLE CONNECTIONS AND JUNCTIONS

FIELD OF THE INVENTION

My present invention relates to a method of making a shrink sleeve of thermoplastic synthetic resin for use as a cable sleeve, especially as a sheath for sealing cable connections and branches.

BACKGROUND OF THE INVENTION

Shrink sleeves are widely used to form water-proof connections have electrical and other cables, especially at cable connections, branches or the like, wherein the sleeve or sheath of a thermally shrinkable thermoplastic synthetic resin is slipped over the cable across the connection or branch and is then heated to shrink the sleeve around the cable insulation on either side of the junction and around the conductors connected at this junction.

At the ends of this sleeve, the latter hugs the insulation and can form a water-proof and hermetic seal thereagainst, the seal bridging the connection so that the entire joint is sealed satisfactorily against the incursion of moisture and against electrical leakage.

Shrink sleeves of the type described have been internally coated with an adhesive which allows a sufficient adhesion with the cable to be achieved. Conventional adhesives for this purpose, however, have failed when pressurized cable networks are employed, i.e. the monitoring of the cable network is effected through the gas (e.g. compressed air) pressurization of the conductors within the insulation jacket thereof. In these cases, the adhesive may lose its effectiveness because of the internal pressure, especially over long periods of time and with use of the cables in elevated temperature environments, thereby causing the shrink sleeve to lose its effectiveness.

While special adhesives have been developed for use in conjunction with pressurized gas monitoring of the integrity of cable networks, these adhesives contribute to a significantly thicker and therefore harder and less flexible sleeve and require, for example, fiber-reinforced sleeves as are described in DE 38 33 415 and EP 0 116 393.

For standard shrink sleeves with a thickness, for example, of about one half those of the special sleeves mentioned above, an adhesive has been provided which has a fifty times greater viscosity than conventional melt adhesives and which satisfies the requirements in pressurized systems. However it has been found that such adhesives require an increased supply of heating to make them effective so that during installation thermal deterioration of the shrink sleeve can occur.

Additionally, it has been found to be a drawback with shrink sleeves that the application of especially high temperatures can give rise to a combustion of the sleeve materials and can spread fire from droplets of the adhesive or combustion of the deteriorating sleeve, thereby reducing the adhesion of the sleeve and its sealing effectiveness and contributing to the spread of fire.

Indeed, as a rule the viscosity of an adhesive will drop with increased heating so that especially at the ends of the sleeve droplets of the adhesive can emerge to present the danger of combustion and fire spread.

As increasing temperature, the stresses within the sleeve can increase to the point that the sleeve can tear and on occasion can completely fall off from the cable splice and/or the cable. There is thus a significant danger even with partial heating of tearing of the sleeve and melting of the adhesive to the point that droplets thereof may emerge in a detrimental manner.

OBJECTS OF THE INVENTION

It is the principal object of the present invention to provide a method of making a shrink sleeve, especially for cable splices, branches and junctions, whereby the afore-described drawbacks can be avoided.

Another object of the invention is to provide a shrink sleeve for sealing a cable connection which can be used effectively for a pressure type and waterproof seal and a cable connection and/or branch and which provides effective adhesion between the sleeve, adhesive and cable, even at elevated temperatures Still another object of the invention is to provide an improved shrink sleeve capable of being thermally shrunk onto a cable, especially an electrical cable which has its integrity monitored by a pressurized gas, e.g. compressed air.

SUMMARY OF THE INVENTION

These objects and others which will become apparent hereinafter are attained, in accordance with the invention, by providing along the internal surface of a shrink sleeve composed of a thermoplastic thermally shrinkable synthetic resin, at least over part of the inner surface thereof, a cross-linkable hot melt adhesive. The invention is based upon my discovery that a cross-linkable hot melt adhesive and preferably one in which the cross linking is activated by a temperature increase, enables on the one hand a rapid activation of the adhesive and, on the other hand, provides a progressive increase in the strength and adhesive force of the adhesive by the heating to temperatures above room temperature by reason of the cross-linking phenomenon.

The cross linking of the hot melt adhesive is thus carried out at the same time as the hot melt adhesive is activated to bond to the insulation sheaths of the cable at the cable connection so that, by reason of this increased hardening of the hot melt adhesive by cross linking, the adhesive will no longer flow or form droplets which can emerge from the sleeve and pose a danger. If the shrink sleeve itself is composed of a noncombustible material or a nonflammable material, the fact that the adhesive cross links to a composition which is less flowable provides a seal for the cable, namely, the combination of a seal and adhesive or hot melt adhesive which is noncombustible and thus does not promote or contribute to combustion even where the cable connection is subjected to elevated temperatures or combustion from some outside source.

According to the invention, the hot melt adhesive used is a synthetic resin adhesive which can be, for example, a polyamide, a polyolefin or a polymer which has been preferably used in the past in the production of rubber compositions, i.e. where cross linking by vulcanization, for example, or by other means common in the rubber field, has been practiced. These polymeric materials can be used alone or in mixtures with one another or in any combination.

With synthetic resin adhesives additives on a polyamide basis, commercially available additives can be used together with polyolefins or copolymers to improve the cross linking capabilities.

The polyolefins can be the various polyethylene types, namely, high-density polyethylene (HDPE), low-density polyethylene, linear low-density polyethylene (LLDPE) and very low-density polyethylene (VLDPE). In addition, ethylene-vinylacetate (EVA), ethylene methacrylate (EMA), ethylene-butylacrylate (EBA) or like polymers can be used. The preferred polymers utilized in the production of rubber are ethylene-propylene-terpolymers, EPM, ethylene propylene rubber, butadiene and butyl rubber.

The hot melt adhesives according ot the invention are synthetic resin adhesives which can be provided with additives inducing a cross linking upon heating and which are capable of bonding or adhesion between the shrink sleeve and the cable. In other words, the cross-linkable hot melt adhesive is located between the shrink sleeve and the cable across the cable connection and upon the application of heat the cross-linking can occur in conjunction with at least partial melting of the adhesive so that the latter will bond to the insulation and the cable sleeve but will be increasingly consolidated by the cross linking to prevent droplets of the adhesive from forming the characteristics of the hot melt adhesive which thus change during the heating process to provide an effective bond between the shrink sleeve and the cable even at elevated temperatures.

The cross linking agent is preferably a peroxide or a mixture of a peroxide with an accelerator and the peroxide can be incorporated directly in the adhesive as, if desired, an activation-delay composition or compound which can delay the cross linking of the adhesive until the sleeve is heated in place. This can prevent premature cross linking of the adhesive in the extruder in which the adhesion and the sleeve are formed or otherwise in the process of producing the assembly.

To minimize the time with which the peroxide or peroxide/accelerator mixture with the cross-linking delay compound are in contact with one another at an elevated temperature, an extruder is used which maintains the composition at the reaction temperature for a significantly shorter time than would normally be the case, i.e. for a much shorter time than would be the processing time in a melting drum or the like.

The desensitizing compound and the peroxide or peroxide/accelerator mixture have a minimized retention time at an elevated temperature since these substances can be mixed with one another shortly before they are fed to the adhesive application nozzles for application to the inner surface of the shrink sleeve. For the subsequent uniform cross linking, an effective mixing is required of these components before application to the shrink sleeve, e.g. in a static mixer.

According to a feature of the invention the cross linker is comprised substantially of a peroxide or a peroxide/accelerator mixture and an inorganic carrier material, e.g. silicon dioxide, or an organic carrier material, especially a synthetic resin and the composition including the carrier material is applied to or incorporated in the hot melt adhesive which can previously have been applied ot the shrink sleeve. In this case, the hot melt adhesive is still relatively soft since its temperature is kept below the reaction temperature of the peroxide or peroxide/accelerator mixture.

In this case, the reaction-limiting desensitizer need not be used. The cross linker can be a peroxide or peroxide plus accelerator filled synthetic resin material. The synthetic resin material used for the cross linker can be the same as a synthetic resin of the adhesive or hot melt adhesive and has a synthetic resin of the thermoplastic shrink sleeve, or is at least compatible as them, so that the synthetic resin of the cross linker is at least miscible with the synthetic resin of the adhesive or sleeve.

The cross linker in the form of a synthetic resin carrier material filled with a peroxide or peroxide/accelerator mixture, can be provided in the form of a foil, especially a perforated foil, or net or in the form of hollow balls of the carrier filled with the peroxide or peroxide/accelerator mixture.

In the case in which the foil or net filled with the peroxide or peroxide/accelerator mixture, is provided as the cross linker for the hot melt adhesive, the foil or net can be applied, after formation of the hot melt adhesive coating on the shrink sleeve by rolling or calendaring the foil or not onto the hot melt adhesive while it is still warm and thereby bonding the foil or net thereto. In the course of applying the foil or net, a rolling with a profiled roller is possible to impart a contour to the inner surface and to press the foil or net into the hot melt material is possible. The foil can be provided with openings, perforations or windows to allow the hot melt material to penetrate into the foil. The openings can be of various configurations and dimensions and, for example, the openings can be circular windows with a diameter of 0.5 mm to 50 mm, preferably between 1 mm and 10 mm. When the windows or openings are square, the same range of dimensions can be provided for each side. Elliptical or rectangular openings can be provided with the small side or dimension being provided in the shrinkage direction.

To the extent that a net, especially an extruded net, is applied, the weight proportion of the cross linker in the hot melt adhesive can be adjusted by regulating the strand thickness of the net. The net can be composed of individual threads or filaments with a thickness of between 0.3 mm and 1.5 mm in this case.

It is, however, also possible to apply the foil carrying peroxide or peroxide/accelerator mixture directly upon the adhesive immediately before the shrinkage operation, with the sleeve than being shrunk thermally onto the foil and the splice. In that case, the foil can be bonded to the adhesive during the shrink step. It is also possible to calendar the adhesive together with the foil onto the shrink sleeve with the foil in a preceding step being treated with the peroxide or peroxide/accelerator mixture.

In all of these cases, the carrier material is preferably a synthetic resin whose processing temperature is significantly lower than the processing temperature of the hot melt adhesive used. In this manner I can ensure that the peroxide or peroxide/accelerator mixture will not react during the processing of the foil or by operations carried out at temperatures below the melting temperature of the carrier material. This is usually the case. The synthetic resins can also include copolymers. In all cases, however, it is required that the synthetic resin of the hot melt adhesive and the synthetic resin of the carrier material be compatible, i.e. identical or at least mutually miscible.

As a result of the clearly different processing temperatures on the one hand of the carrier material synthetic resin and on the other of the synthetic resin of the adhesive, the heat applied to the shrink sleeve and the adhesive will thus initially melt the synthetic resin of the carrier material and cause the peroxide or peroxide/accelerator mixture to react with the adhesive for cross linking. This ensures that with further increase in temperature, the adhesive itself will not flow. Of course it should be noted that with increasing cross linking, the adhesion of the adhesive may diminish so that the process has limits with respect to the degree of cross linking which can be effective. In practice, the degree of cross linking should be only sufficient to prevent outflow of the droplets of the hot melt adhesive.

When the carrier material is the same synthetic resin as that of the adhesive, the carrier material synthetic resin should be correspondingly modified so that it can be worked with the same machine parameters, for example in an extrusion apparatus, as the adhesive material. In any case, the synthetic resin of the carrier material is so modified with respect to the synthetic resin for the adhesive coating that processing at a lower temperature than is used for the adhesive layer is possible. Where cross linking is to be limited, lower processing temperatures, desensitized peroxide can be used to allow lower temperatures to be employed and in general reaction of the temperature-sensitive peroxide or peroxide/accelerator mixture should be avoided before the desired cross linking is to occur.

In the case in which the cross linker is to be introduced as cross linker/filled hollow balls, the hollow balls can be spread upon the still sticky hot melt adhesive following the application of the hot melt coating to the shrink sleeve and then, if desired, rolled onto the hot melt coating or into it and thus bonded with the hot melt coating. The hollow balls can be microspheres which are spread on the adhesive while the latter is in a doughy state so that some adhesion does occur. The hollow spheres can be additionally rolled into or onto the layer via profiled or nubby rollers to effect a form of mixing of the hot melt adhesive with the hollow spheres over the depth of the hot melt adhesive coating.

Nubby rollers can be used whose nubs have diameters of 0.5 mm ot 5 mm, especially about 1 mm. The spacing of the nubs is so selected that it is of the same order of magnitude as the nub diameter. During this process, the temperature of the adhesive is kept so low that a reaction of the peroxide or peroxide accelerator mixture is excluded. The penetration of the nubs into the hot melt adhesive coating can amount to 20% to 95% of the adhesive layer thickness.

The concentration of the peroxide or of the peroxide accelerator mixture in the carrier material (synthetic resin, inorganic carrier or hollow spheres) preferably is between 5% by weight to 95% by weight and the cross linker can be applied ot the surface of the melt adhesive with a concentration of 0.1% by weight to 20% by weight, preferably 1% by weight to 4% by weight. The peroxide can be an organic peroxide, especially 1,1-di(t-butylperoxy)-3,3,5-trimethylcyclohexane. Other peroxides which can be used are:

2,5-dimethyl-2,5-di-(t-butylperoxy)hexen-3
2,5-dimethyl-2,5-di-(t-butylperoxy)hexane-3
α,α'-di(t-butylperoxy)diisopropybenzene
dicumylperoxide (bis(1-methyl-1-phenylethyl)peroxide
ethyl-3,3-di(t-butylperoxy)butyrate
ethyl-3,3-di(t-amylperoxy)butyrate
n-butyl-4,4-di(butylperoxy)valerate
1,1-di(t-butylperoxy)cyclohane.

When a peroxide/accelerator mixture is used, it preferably contains more than 10% by weight of the peroxide.

The peroxide used should be selected to have a shelf life for shrink sleeves at about 50° C. for periods of at least three years. In addition, a brief thermal loading up to 70% should be possible without noticeable change in the viscosity of the hot melt adhesive. This means that the viscosity index should amount to a maximum of 10%. The cross linking temperature should be about 100° C. without generation of gases or toxic or noxious byproducts. Any diffusion of peroxide from the carrier material and from the hot melt adhesive should be insignificant.

The accelerator can be preferably a reactive monomer and/or oligomer with at least two reactive double and/or triple carbon-carbon bonds, especially liquid triallylcyanurate or triallylisocyanurate. The following other accelerators can also be used:

triallyltrimellitate
triallylphosphate
triallylpropane
trimethacrylate
ethylenglycoldimethacrylate.

These accelerators can be used individually or in mutual admixture in combination with one or more of the peroxides mentioned to form the peroxide/accelerator mixture.

BRIEF DESCRIPTION OF THE DRAWING

The above and other objects, features, and advantages will become more readily apparent from the following description, reference being made to the accompanying drawing in which:

FIG. 1 is a diagrammatic cross sectional view of a splice utilizing a shrink sleeve according to the invention FIG. 2 is a cross sectional view through a shrink sleeve provided with the cross-linking substance in the form of a perforated foil;

SPECIFIC DESCRIPTION

Figure 3:
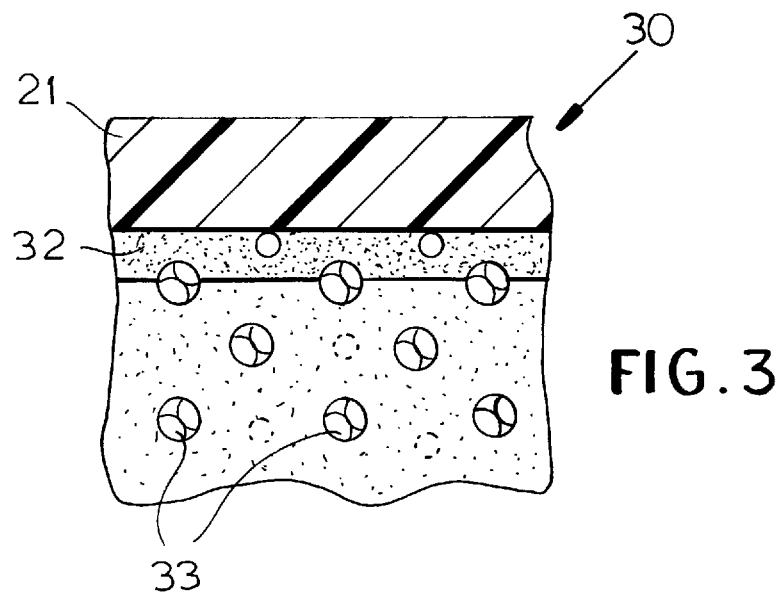
FIG. 3 is a cross sectional view in highly diagrammatic form illustrating the use of microspheres containing the cross-linking linking substance distributed in the hot melt adhesive.

In FIG. 1 of the drawing, I show a cable system represented generally at 10 and in which the insulating sheaths 11, 12 of two cables are connected, can be pressurized with compressed air or other pressurized gas and in which the conductors 13 and 14 of these cables can be twisted together at 16 to form a junction. The shrink sleeve 17 which is applied to this junction can have a hot melt adhesive coating 18 along the inner surface and can be provided with a cross linking material as has been described above and will be described below. The sleeve 17, 18 is heated, e.g. via a torch or hot-air blower to shrink the sleeve around the connection 16 and the insulating sheaths 12 to seal and insulate the connection.

The shrink sleeve assembly 20 of FIG. 2 comprises the thermoplastic sheath 21 and the lining 22 of the hot melt adhesive into which is pressed a foil 23 consisting of a carrier synthetic resin containing a peroxide compound or mixture of a peroxy compound and an accelerator, as described, the foil 23 having perforations 24 into which the hot melt adhesive can flow during manufacture of the sleeve 20. The peroxy compound can cross link the hot melt adhesive to render the latter stable against flow as the sleeve is shrunk onto the cable and the ends of the sleeve are bonded to the insulation jackets of the cable.

Figure 4:
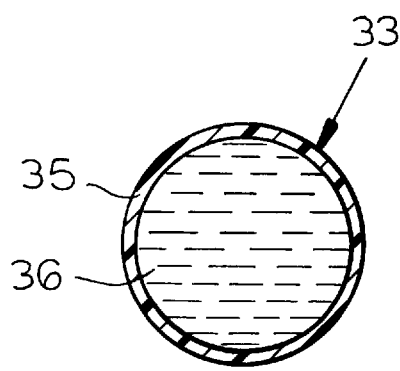
FIG. 4 is a cross sectional view through a microsphere.

As can be seen from FIG. 3, the hot melt adhesive 32 for the sleeve 30 whose synthetic resin sheath 21 is lined with that hot melt adhesive, can contain microspheres 33 of the type shown in FIG. 4. These microspheres comprise an outer shell 35 of a synthetic resin which is compatible with that of the hot melt adhesive and the cross linking compound 36.

Figure 5:
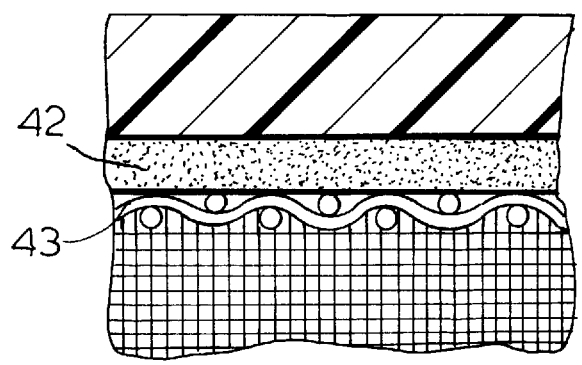
FIG. 5 is a cross sectional view similar to FIG. 3 showing the use of a net carrying the cross-linking substance.

The embodiment of FIG. 5 utilizes a screen 43 made from filaments of synthetic resin compatible with the hot melt adhesive 42 and containing the cross linking agent. In all of the embodiments described when the shrink sleeve is heated to shrink it around the cable, the cross linking reaction is initiated so that the hot melt adhesive becomes more viscous and less flowable, thereby eliminating the release of droplets of the hot melt adhesive.

By way of an example, the shrink sleeve of the invention can be produced by extrusion and is characterized by very low probability of crack formation. Subsequently a cross linking is carried out and the shrink sleeve is stretched and cooled in the stretched state. The shrink sleeve can be fabricated from a peroxide-containing synthetic resin web which is extruded at a temperature below the reaction temperature of the peroxide so that the synthetic resin web is partially cross linked and is stretched in a cold state at a temperature below the crystallite melting point or the glass transition temperature of the partially cross-linked synthetic resin web. The glass transition temperature is the temperature in the region between the glass and elastomeric states. Only upon the heating to shrink the sleeve onto the cable is the sleeve itself completely cross linked.

The shrink sleeve can have a cover layer of a thermomorphic synthetic resin material which can signal by a color change or some other transition, the heating of the sleeve for a sufficient length of time to the appropriate shrink temperature for proper shrinking of the sleeve onto the cable. The cover layer can include, in addition to such thermo-indicator means, agents protecting the sleeve against attack by microorganisms, rodent gnawing and insect attack. The sleeve can thus include an insecticide.

After the sleeve has been partially cross linked and stretched, it is provided with a coating of the thermoplastic hot melt adhesive for which I can use a mixture of very low density polyethylene (VLDPE) and ethylenebutylacetatecopolymer (EVA). The coating of this copolymer is effected at a temperature of 170° C. and the adhesive is then allowed to cool or is forcibly cooled to a temperature of about 70° C. at which a foil of a cross linker is bonded to the adhesive by rolling it with a profiled roller into the adhesive. This temperature is so selected that while the adhesive is still tacky, the temperature is not enough to induce a crosslinking reaction with the cross linker. The foil is composed of a carrier material in the form of a synthetic resin having a melting temperature of about 100° C., i.e. above the working temperature of 70° C. and at which the crosslinking reaction with the included peroxide or peroxide/accelerator mixture can occur.

The foil is a perforated foil with round holes of a diameter of about 3 mm and the profiled roller has a depth between crests and troughs of about 0.5 mm so that intimate contact approximating a mixture of the hot melt adhesive and the peroxide carrier can be effected. The thermo-indicator in the cover layer of the shrink sleeve is set to correspond to the peroxide reaction or cross-linking temperature of about 100° C. and thus can signal by a color change the attainment of this temperature.

The sleeve thus fabricated is applied to the cable as has been described in connection with FIG. 1 and is heated until the color indicator signal cross-linking reaction has occurred, the sleeve being shrunk on the cable. In practice it is found that the sleeve can withstand substantial internal pressures as are common with cable systems monitored by gas pressurization.

I claim:

1. A method of making a shrink sleeve of a thermoplastic synthetic resin for cable connections and branches, comprising the steps of:

forming a layer of a thermoplastic synthetic resin shrinkable at a high temperature, thereby providing a shrinkable sleeve for sealing cable connections and branches; and forming an adhesive layer on an entire internal surface of said sleeve by:
   lining a layer of a cross-linkable hot melt adhesive over said entire internal surface of the sleeve,
   thereafter providing a layer of a perforated carrier synthetic resin containing a cross linker over said layer of said hot melt adhesive, and
   pressing said layer of the carrier resin into the layer of said hot melt adhesive at a low temperature lower than said high temperature, thereby providing a flow of the hot adhesive into said layer of the synthetic resin and arresting said flow upon heating the sleeve at said high temperature by cross linking of the layer of hot adhesive by said layer of the carrier synthetic resin.

2. The method defined in claim 1 wherein said hot melt adhesive is a synthetic resin adhesive.

3. The method defined in claim 2 wherein said hot melt adhesive is a polyamide, polyolefin or a rubber-making polymer.

4. The method defined in claim 2 wherein the synthetic resin adhesive is selected from the group which consists of EPDM, EPM, butadyene, butyl rubber and mixtures thereof.

5. The method defined in claim 1 wherein said cross linker includes a peroxide or a peroxide and accelerator mixture which optionally contains a cross-linking reaction inhibitor incorporated in the hot melt adhesive.

6. The method defined in claim 1 wherein said cross linker comprises an inorganic or organic carrier containing a peroxide or a peroxide and accelerator mixture.

7. The method defined in claim 6 wherein said cross linker comprises a foil, net or hollow spheres of a synthetic resin carrier material containing a peroxide or a peroxide and accelerator mixture.

8. The method defined in claim 1 wherein said cross linker is applied to the hot melt adhesive while it is in a flowable state at said low temperature and is bonded thereto.

9. The method defined in claim 8 wherein the hollow spheres are spread on the hot melt adhesive and pressed into the hot melt adhesive.

10. The method defined in claim 8 wherein said hot melt adhesive comprises a resin identical to or miscible with said carrier synthetic resin.

11. The method defined in claim 8 wherein a concentration of the peroxide or the peroxide and accelerator mixture in the carrier is between 5% by weight and 70% by weight, the cross linker is used in a concentration of 0.1% by weight to 20% by weight in the hot melt adhesive coating said inner surface of the shrink sleeve.

12. The method defined in claim 8 wherein the peroxide is:

1,1-di(t-butylperoxy)-3,3,5-trimethylcyclohexane,
2,5-dimethyl-2,5-di-(t-butylperoxy)hexen-3,
2,5-dimethyl-2,5-di-(t-butylperoxy)hexane-3,
α,α'-di(t-butylperoxy)diisopropybenzene,
dicumylperoxide (bis(1-methyl-1-phenylethyl)peroxide,
ethyl-3,3-di(t-butylperoxy)butyrate,
ethyl-3,3-di(t-amylperoxy)butyrate,
n-butyl-4,4-di(butylperoxy)valerate, or
1,1-di(t-butylperoxy)cyclohane.

13. The method defined in claim 8 wherein the peroxide and accelerator mixture contains more than 10% by weight peroxide.

14. The method defined in claim 5 wherein an accelerator in said peroxide and accelerator mixture is a reaction monomer or oligomer of at least two mutually reactive double or triple carbon-carbon bond compounds.

15. The method defined in claim 14 wherein said accelerator is:

triallylcyanurate, triallylisocyanurate, triallyltrimellitate, triallylphosphate, triallylpropane, trimethacrylate, or ethylenglycoldimethacrylate.

16. The method defined in claim 1 wherein said adhesives are flame stabilized.

17. A shrink sleeve for application to an electrical cable comprising:

a layer of a thermoplastic synthetic resin shrinkable at a high temperature, said layer forming a shrinkable sleeve for sealing cable connections and branches;

an adhesive layer coated on an entire internal surface of said sleeve and comprising:

a layer of a cross-linkable hot melt adhesive lined with said entire internal surface of the sleeve, and;

a layer of a perforated carrier synthetic resin containing a cross linker on said layer of said hot melt adhesive, said layer of said perforated carrier resin being pressed into said layer of said hot melt adhesive which flows into said perforated synthetic resin at a low temperature lower than said high temperature, flow of the hot melt adhesive being arrested at the high temperature upon cross linking of the layer of hot adhesive by said layer of the cross linker.

18. The shrink sleeve defined in claim 17 wherein said cross linker is selected from the group which consists of:

1,1-di(t-butylperoxy)-3,3,5-trimethylcyclohexane, 2,5-dimethyl-2,5-di-(t-butylperoxy)hexen-3, 2,5-dimethyl-2,5-di-(t-butylperoxy)hexane-3, α,α'-di(t-butylperoxy)diisopropybenzene, dicumylperoxide (bis(1-methyl-1-phenylethyl)peroxide, ethyl-3,3-di(t-butylperoxy)butyrate, ethyl-3,3-di(t-amylperoxy)butyrate, n-butyl-4,4-di(butylperoxy)valerate, or 1,1-di(t-butylperoxy)cyclohane, and said cross-linking agent is provided in a synthetic resin carrier having a softening temperature below a temperature at which said cross linking agent is activated.

19. The shrink sleeve defined in claim 18 wherein said cross linker is provided in microspheres dispersed in and on said hot melt adhesive.

20. The shrink sleeve defined in claim 18 wherein said cross linker is incorporated into a synthetic resin in an open work structure pressed into said hot melt adhesive.

21. A method of using a shrink sleeve of a thermoplastic synthetic resin for cable connections and branches, comprising the steps of:

forming a layer of said thermoplastic synthetic resin shrinkable at a high temperature, thereby providing a shrink sleeve;

forming an adhesive layer on an entire internal surface of said sleeve by:

lining a layer of a cross-linkable hot melt adhesive over said entire internal surface of the sleeve, thereafter providing a layer of a perforated carrier synthetic resin containing a cross linker over said layer of hot melt adhesive, and pressing said layer of the carrier synthetic resin into said layer of hot melt adhesive at a low temperature lower than said high temperature, thereby providing a hot adhesive flow into said layer of the carrier synthetic resin; and hereafter heating the sleeve at said high temperature to cross link the layer of hot adhesive by said layer of the carrier resin, thereby arresting the flow of said adhesive upon shrinking of the sleeve at the high temperature.

22. A shrink sleeve for application to an electrical cable comprising:

a sheath of a thermally shrinkable synthetic resin;

a layer of a hot melt adhesive on an inner surface of said sheath; and a cross-linking agent on said hot melt adhesive thermally activatable upon heating of said sleeve to shrink said sleeve to effect cross linking of said hot melt adhesive, said linking agent is selected from the group which consists of:

1,1-di(t-butylperoxy)-3,3,5-trimethylcyclohexane, 2,5-dimethyl-2,5-di-(t-butylperoxy)hexen-3, 2,5-dimethyl-2,5-di-(t-butylperoxy)hexane-3, α,α'-di(t-butylperoxy)diisopropybenzene, dicumylperoxide (bis(1-methyl-1-phenylethyl) peroxide, ethyl-3,3-di(t-butylperoxy)butyrate, ethyl-3,3-di(t-amylperoxy)butyrate, n-butyl-4,4-di(butylperoxy)valerate, or 1,1-di(t-butylperoxy)cyclohane, said cross-linking agent being provided in a synthetic resin carrier having a softening temperature below a temperature at which said cross linking agent is activated and being incorporated into a synthetic resin in an open work structure pressed into said hot melt adhesive.

* * * * *